United States Patent [19]

Osanai et al.

[11] Patent Number: 4,656,587
[45] Date of Patent: Apr. 7, 1987

[54] APPARATUS FOR CONTROLLING CONTINUOUSLY VARIABLE TRANSMISSION

[75] Inventors: Akinori Osanai; Takao Niwa; Takeshi Gono, all of Susono, Japan

[73] Assignee: Toyota Jidosha Kabushiki Kaisha, Toyota, Japan

[21] Appl. No.: 632,663

[22] Filed: Jul. 20, 1984

[30] Foreign Application Priority Data

Aug. 22, 1983 [JP] Japan .................................. 58-151730

[51] Int. Cl.⁴ ............................................. B60K 41/12
[52] U.S. Cl. .................................... 364/424.1; 74/866; 474/12; 474/28
[58] Field of Search ................ 364/424.1; 74/858, 859, 74/860, 866; 474/11, 12, 18, 28

[56] References Cited

U.S. PATENT DOCUMENTS

| 4,515,040 | 5/1985 | Takeuchi et al. | 74/860 |
| 4,534,243 | 8/1985 | Yokoyama et al. | 474/28 |
| 4,536,171 | 8/1985 | Tanaka et al. | 74/862 |
| 4,543,077 | 9/1985 | Yamamuro et al. | 474/12 |

Primary Examiner—Parshotam S. Lall
Attorney, Agent, or Firm—Oblon, Fisher, Spivak, McClelland & Maier

[57] ABSTRACT

The apparatus for controlling the CVT for a vehicle includes means for controlling a desired speed ratio of the CVT, means for storing a map of engine speed versus positions of the throttle valve for providing the minimum fuel consumption and means for calculating, by use of the map, a desired engine speed value corresponding to the detected throttle position. Also provided are means for determining a first operating area of the engine speed based upon the throttle opening, which area is spaced from the desired engine speed and is capable of providing sufficient power to obtain a smooth acceleration at a fixed transmission ratio as well as means for determining a second operating area of the engine speed based on the vehicle speed where the engine speed is high in relation to the vehicle speed, the second area being spaced from the desired engine speed and being capable of providing sufficient power to obtain a smooth acceleration at a fixed transmission ratio. Means are also provided for providing a signal to the transmission varying means for maintaining a current fixed speed ratio when the engine is operating in the first or second area, as well as means for providing a signal to the transmission varying means for varying the speed ratio so that the actual engine speed corresponds to the desired engine speed when the engine is in an area other than the first and second areas.

1 Claim, 6 Drawing Figures

APPARATUS FOR CONTROLLING CONTINUOUSLY VARIABLE TRANSMISSION

BACKGROUND OF THE INVENTION

1. Field of the Invention

The present invention relates to an apparatus for controlling a continuously variable transmission (CVT) used in a vehicle.

2. Description of the Prior Art

A CVT capable of continuously controlling a speed ratio e (=output side rotational speed Nout/input side rotational speed Nin) is used in a vehicle as a power transmission unit with an excellent specific fuel consumption. A desired engine speed Ne' is set as an engine speed to achieve an output horse power of the engine set as a function of a pedalling amount of an accelerator pedal for example with a minimum fuel consumption, and the CVT is controlled such that an actual engine speed Ne is equalized to the desired engine speed Ne'. In the prior method of controlling the CVT, the speed change of the CVT, i.e. the alteration in the speed ratio e is always effected when there is some deviation between Ne and Ne', while the transmission loss of the CVT is so large during the speed change that disadvantages are encountered in both the specific fuel consumption and driveability of the engine. Also in the prior CVT, when a throttle valve is fully opened to accelerate a vehicle, the engine speed Ne reaches the maximum value resulting increased noise due to the reduction of the speed ratio e prior to the increase of a vehicle speed V.

SUMMARY OF THE INVENTION

An object of the present invention is to provide an apparatus for controlling a CVT which is to improve acceleration performance and specific fuel consumption in the acceleration of an vehicle.

According to the present invention, in order to achieve this object, the apparatus for controlling the CVT for a vehicle includes means for controling a desired speed ratio of the CVT, means for storing a map of engine speed versus positions of the throttle valve for providing the minimum fuel consumption, means for detecting the actual position of the throttle valve, means for detecting the actual engine speed, means for detecting the actual vehicle speed and means for calculating, by use of the map, a desired engine speed value corresponding to the detected throttle position. Also provided are means for determining a first operation area of the engine speed based upon the throttle opening, which area is spaced from the desired engine speed and is capable of providing sufficient power to obtain a smooth acceleration at a fixed transmission ratio due to an absence of transmission loss, as well as means for determining a second operating area of the engine speed based on the vehicle speed where the engine speed is high in relation to the vehicle speed, the second area being spaced from the desired engine speed and being capable of providing sufficient power to obtain a smooth acceleration at a fixed transmission ratio together with the absence of transmission loss. Means are also provided for providing a signal to the transmission varying means for maintaining a current fixed speed ratio when the engine is operating in the first or second area, as well as means for providing a signal to the transmission varying means for varying the speed ratio so that the actual engine speed corresponds to the desired engine speed when the engine is in an area other than the first and second areas.

When the engine speed Ne is high though the vehicle speed V is low, i.e. (a) $Nr1 \leq Ne < Ne'$, there is still enough drive force for accelerating satisfactorily the vehicle only by the increase of the engine speed Ne even if the speed ratio e is fixed. Thus, in this case the specific fuel consumption is to be improved by fixing the speed ratio e while ensuring satisfactory acceleration. Also, a condition where the engine speed Ne reaches the maximum value to increase noise prior to the increase of the vehicle speed V due to the speed change of the CVT is avoided when a throttle valve is fully opened, and satisfactory drive feeling is given to a driver by the increase of the vehicle speed V together with the increase of the engine speed Ne due to the fixation of the speed ratio e.

Further, acceleration comparable to that due to a speed change giving large transmission loss of the CVT is obtained since Ne is sufficiently near the desired engine speed Ne' irrespective of the fixation of the speed ratio e even when Ne<Nr1 and the allowance of drive force is small, i.e. even when (b) $Ne < Nr1$ and $Ne \geq Nr2$, the speed ratio e is fixed so that necessary and sufficient acceleration is to be ensured while the specific fuel consumption is to be improved.

Preferably in the cases other than those of (a), (b), the CVT is allowed to change the speed rate to provide ready acceleration.

The accompanying drawings, which are incorporated in and constitute part of this specification, illustrate embodiments of the present invention and, together with the description, serve to explain the principle of the present invention.

DETAILED DESCRIPTION OF PREFERRED EMBODIMENTS

Figure 1:
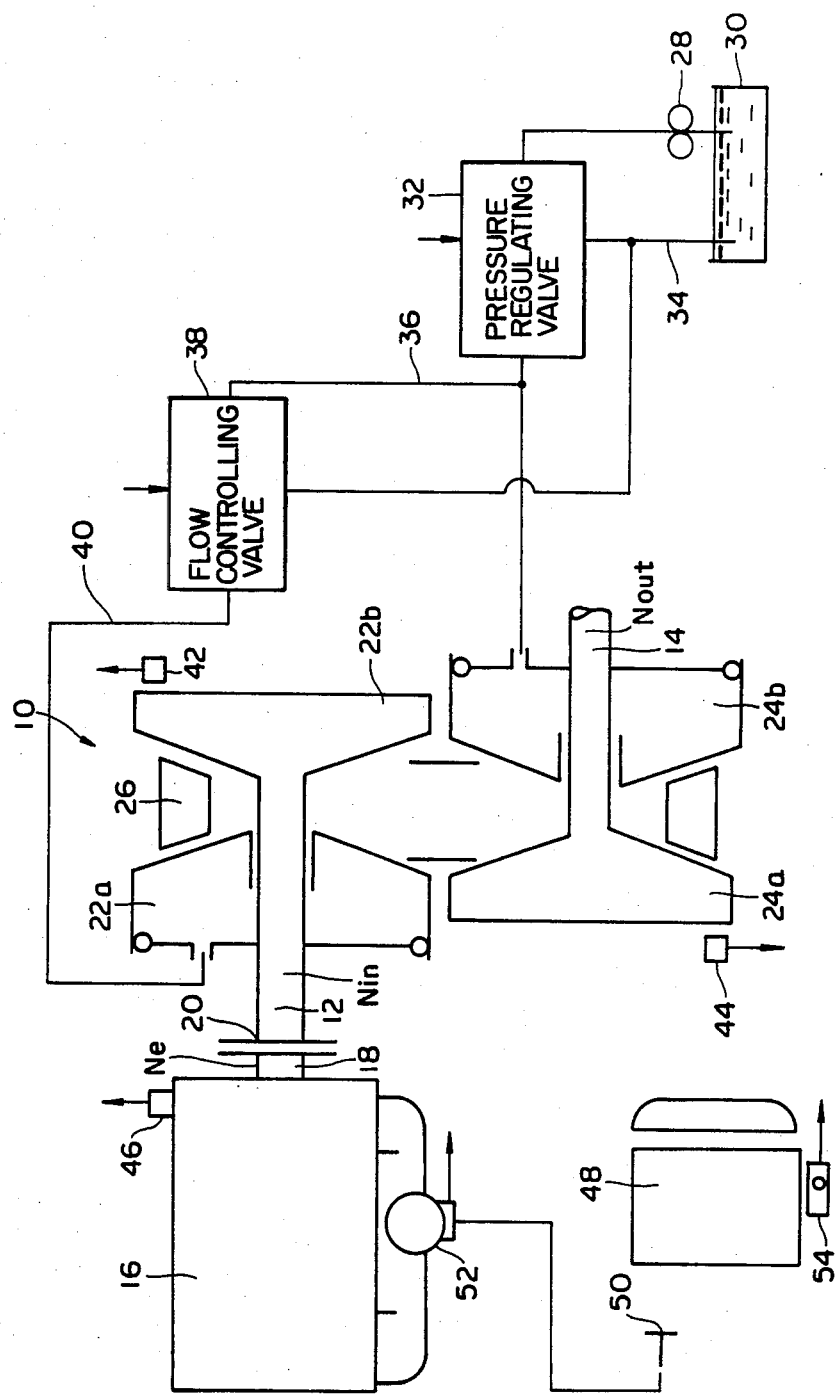
FIG. 1 is a schematic view showing a whole CVT to which the present invention is applied.

In FIG. 1, a CVT 10 is provided with an input shaft 12 and an output shaft 14 parallel to each other. The input shaft 12 is provided coaxially with a crankshaft 18 of an engine 16 and connected to the crankshaft 18 through a clutch 20. Input side pulleys 22a, 22b are provided opposed to each other, one input side pulley 22a being provided on the input shaft 12 to be moved axially as a movable pulley and fixed rotationally and the other input side pulley 22b being fixed to the input shaft 12 as a fixed pulley. Similarly, output side pulleys 24a, 24b are provided opposed to each other, one output side pulley 24a being fixed to the output shaft 14 as a fixed pulley and the other output side pulley 24b being provided on the output shaft 14 to be moved axially as a movable pulley and fixed rotationally. The opposed surfaces of the input and output side pulleys 22a, 22b and 24a, 24b are formed tapered and a belt 26 having an equilateral trapezoidal section is trained over the input and output side pulleys 22a, 22b and 24a, 24b. An oil pump 28 sends oil in an oil reservoir 30 to a pressure regulating valve 32. The pressure regulating valve 32 controls line pressure in an oil path 36 by varying the escaping amount of oil to a drain 34 and the line pressure in the oil path 36 is sent to a hydraulic cylinder and a flow controlling valve 38 of the output side pulley 24b. The flow controlling valve 38 controls oil flow supplied from the oil path 36 to an oil path 40 connected to the hydraulic cylinder of the input side disk 22a and oil flow drained from the oil path 40 to the drain 34. Press forces of the input and output side pulleys 22a, 22b and 24a, 24b against the belt 26 are controlled by oil pressure in the input and output side hydraulic cylinders and the engaging radii of the belt 26 on the tapered surfaces of the input and output side pulleys 22a, 22b and 24a, 24b are varied in relation to the press forces to vary thereby the speed ratio e of the CVT 10 (=Nout/Nin, where Nout is the rotational speed of the output shaft 14 and Nin is the rotational speed of the input shaft 12. In this embodiment, Nin = engine speed Ne.) The line pressure in the output side hydraulic cylinder is controlled to the necessary minimum value to avoid the slip of the belt 26 and ensure the power transmission for restraining the drive loss of the oil pump 28 so that the speed ratio e is controlled by oil pressure in the input side hydraulic cylinder. Further, while the oil pressure in the input side hydraulic cylinder $\leq$ the oil pressure in the output side hydraulic cylinder, since the pressure receiving area of the input side hydraulic cylinder $>$ the pressure receiving area of the output side hydraulic cylinder, the press forces of the input side pulleys 22a, 22b are to be made larger than that of the output side pulleys 24a, 24b. Input and output side rotational angle sensors 42 and 44 detect respectively the rotational speeds Nin, Nout of the input and output shafts 12 and 14, and a water temperature sensor 46 detects cooling water temperature in the engine 16. An accelerator pedal 50 is provided in a drivers seat 48 to be interlocked with a throttle valve in an intake path, and a throttle position sensor 52 detects the throttle position $\theta$. A shift position sensor 54 detects the shift range of a shift lever near the drivers seat.

Figure 2:
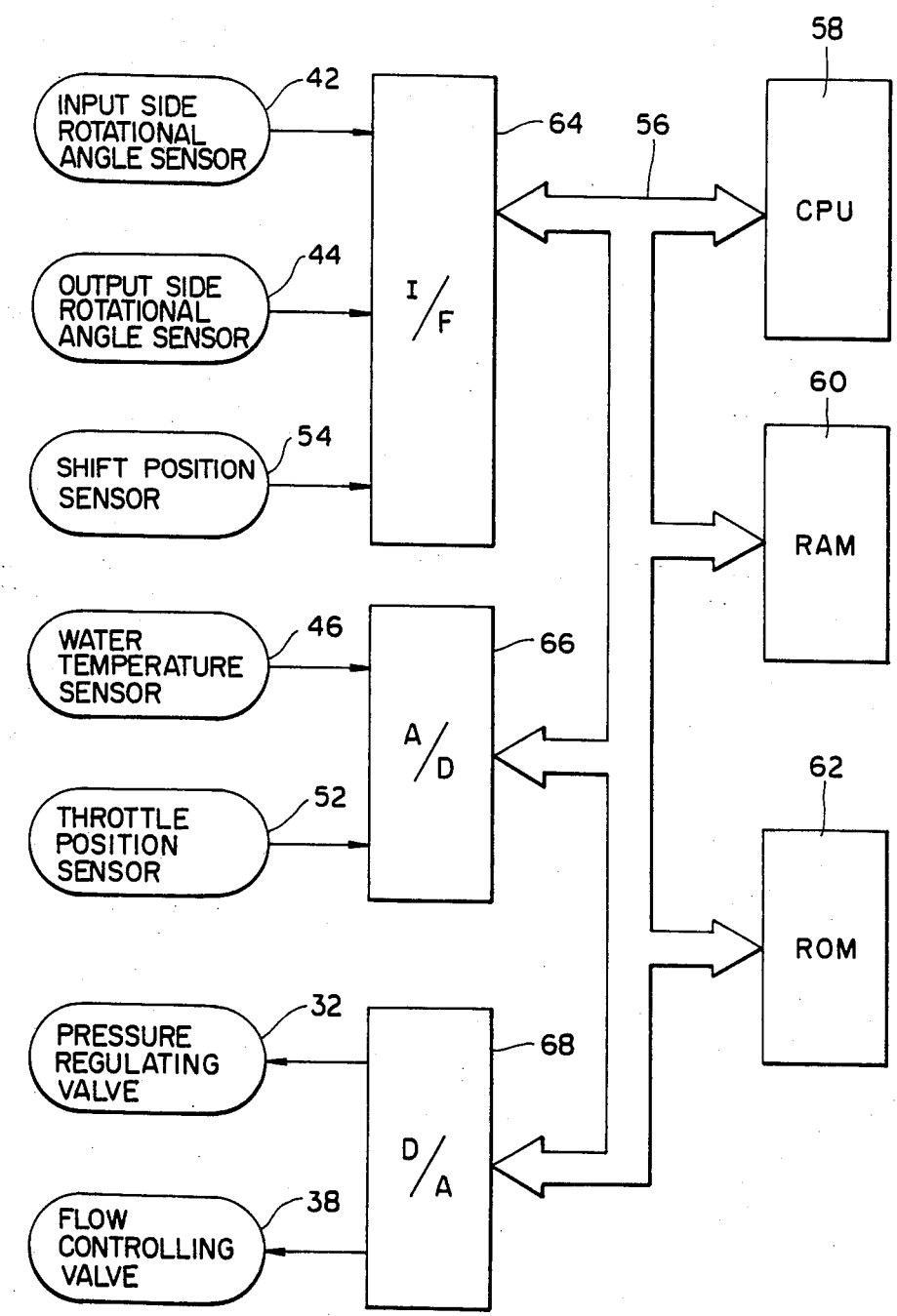
FIG. 2 is a block diagram showing an electronic control unit.

FIG. 2 is a block diagram showing an electronic control unit. CPU 58, RAM 60, ROM 62, I/F (interface) 64, A/D (analog/digital converter) 66 and D/A (digital/analog converter) 68 are interconnected with each other by an address data bus 56. The I/F 64 receive pulse signals from the input side rotational angle sensor 42, the output side rotational angle sensor 44 and the shift position sensor 54. The A/D 66 receives analog signals from the water temperature sensor 46 and the throttle position sensor 52 and the D/A 68 generates pulses to the pressure regulating valve 32 and the flow controlling valve 38.

Figure 3:
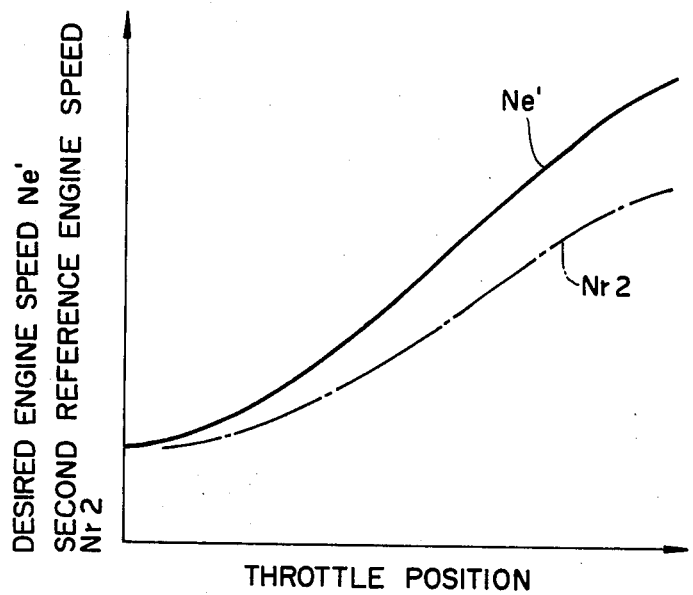
FIG. 3 is a graph showing the relationship between a throttle position, a desired engine speed and a second reference engine speed.

FIG. 3 shows the relationship between the throttle position $\theta$, the desired engine speed Ne' and the second reference engine speed Nr2. Required horse power and throttle position $\theta$ are set as a function of the pedalling amount of the accelerator pedal 50 (thus the required horse power is a function of the throttle position $\theta$) and the engine speed Ne which is to provide each required horse power with the minimum fuel consumption is set as the desired engine speed Ne'. The second reference engine speed Nr2 is sufficiently near the desired engine speed Ne' so that the Nr2 is set as the minimum engine speed for generating necessary and sufficient acceleration comparable to that generated when the speed change is performed even if the speed ratio e is fixed. In the present invention, the speed change of the CVT 1 is stopped to fix the speed ratio e when $Nr2 \leq Ne < Ne'$.

Figure 4:
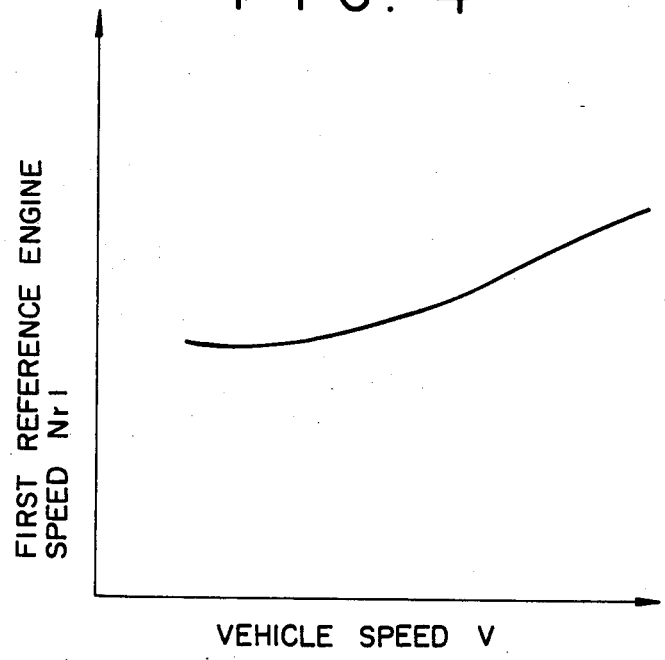
FIG. 4 is a graph showing the relationship between a vehicle speed and a first reference engine speed.

FIG. 4 shows the relationship between the vehicle speed V and the first reference engine speed Nr1. When the engine speed Ne is sufficiently high as the vehicle speed V is low, there is enough allowance in drive force during acceleration and the satisfactory acceleration is obtained even when the speed ratio e is fixed. Also, in this case the Ne is lower than the Ne' so that noises are to be advantageously restrained. The first reference engine speed Nr1 is set as the minimum engine speed giving necessary and sufficient allowance to the drive force, and stops the speed change of the CVT 10 to fix the speed ratio e in the present invention when $Nr1 \leq Ne < Ne'$.

Figure 5:
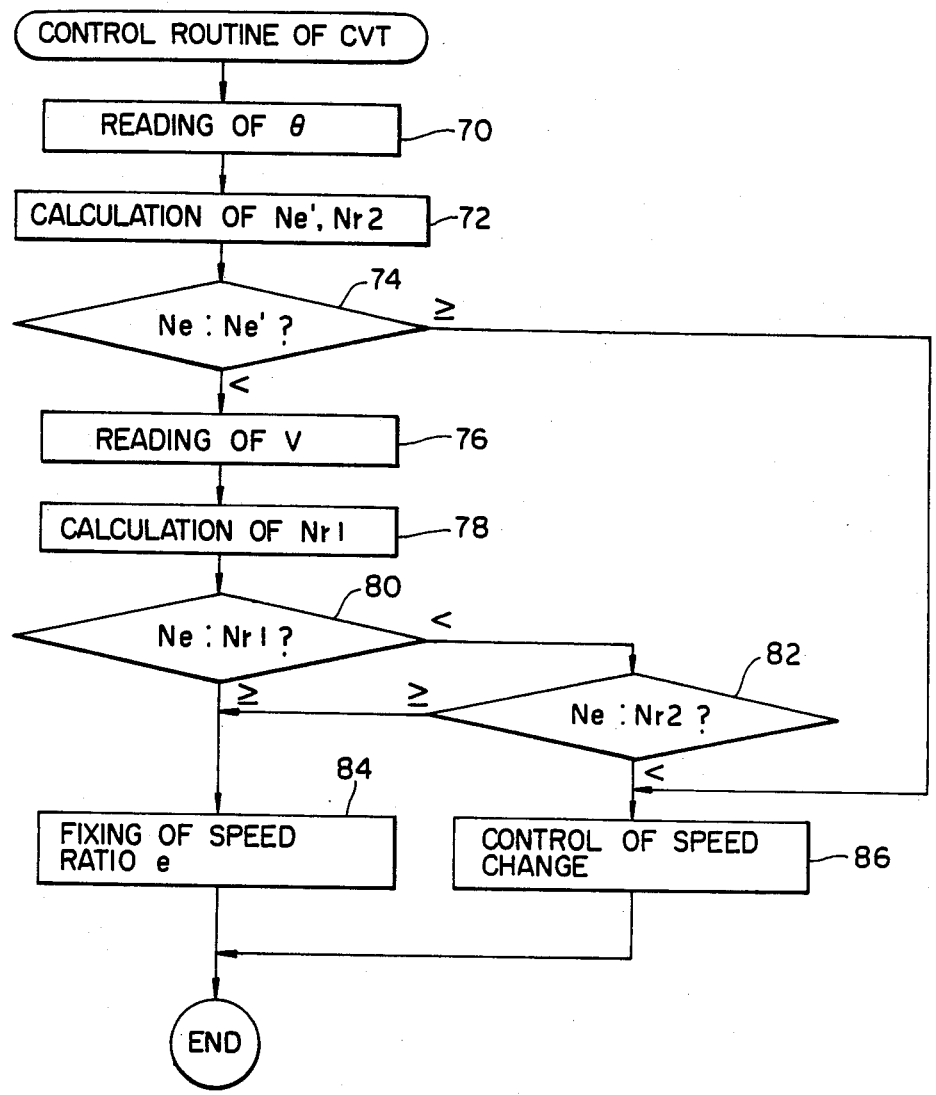
FIG. 5 is a flow chart showing a control routine of the CVT.

FIG. 5 is a flow chart showing a control routine of the CVT 10. When (a) $Nr1 \leq Ne < Ne'$ and (b) $Ne < Nr1$ and $Ne \geq Nr2$, the speed ratio e of the CVT 10 is fixed, and in the other cases the CVT 10 is subjected to the speed change to provide Ne=Ne'. Referring particularly to each step, in step 70 is read the throttle position $\theta$. In step 72 are calculated the desired engine speed Ne' and the second reference engine speed Nr2 from the throttle position $\theta$. In step 74 is compared the actual engine speed Ne with the desired engine speed Ne' and advance is made to step 76 if $Ne < Ne'$ and to step 86 if $Ne \geq Ne'$ respectively. In step 76 is read the vehicle speed V. In step 78 is calculated the first reference engine speed Nr1 from the vehicle speed V. In step 80 is compared the actual engine speed Ne with the first reference engine speed Nr1 and advance is made to step 84 if $Ne \geq Nr1$ and to step 82 if $Ne < Nr1$ respectively. In step 82 is compared the actual engine speed Ne with the second reference engine speed Nr2 and advance is made to step 84 if $Ne \geq Nr2$ and to step 86 if $Ne < Nr2$ respectively. In step 84 is fixed the speed ratio e. In step 86 is controlled the speed change (the speed ratio e is varied).

Figure 6:
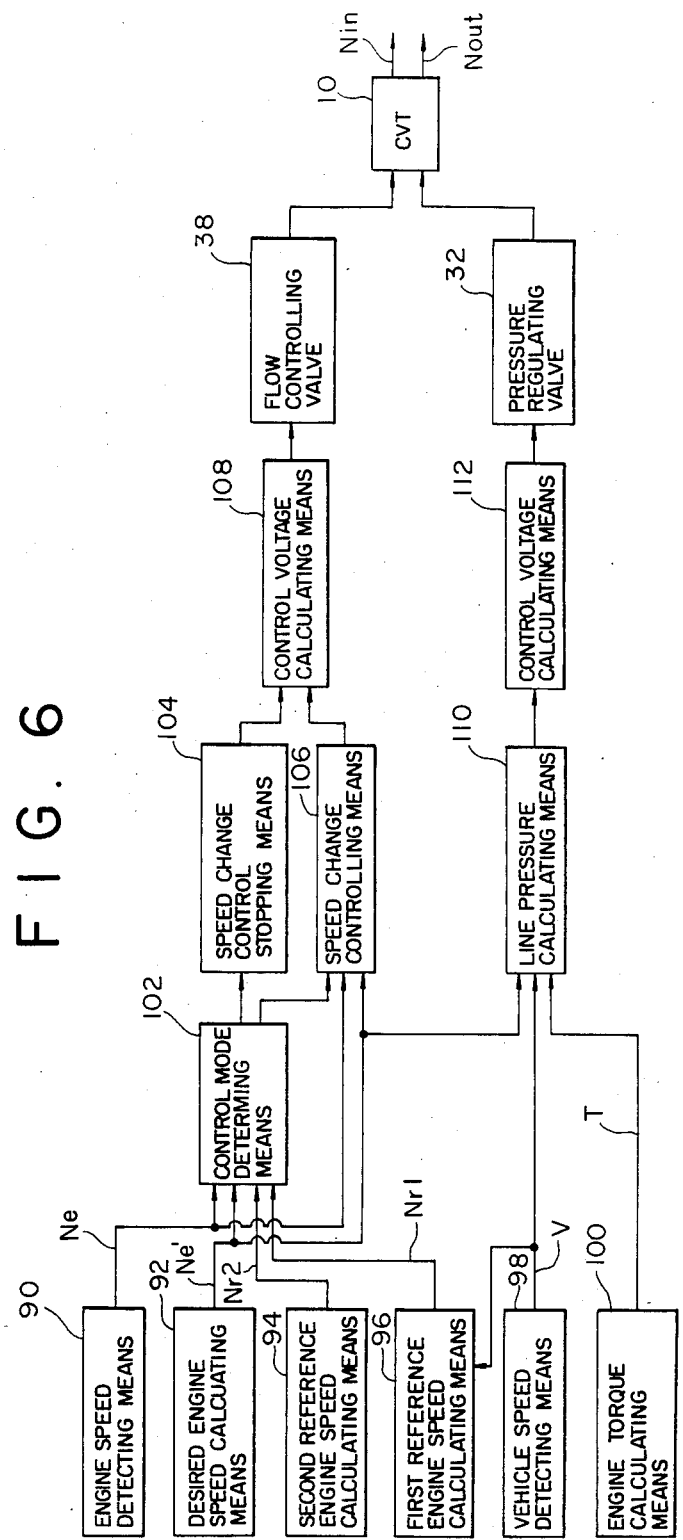
FIG. 6 is a block diagram showing the function of the present invention.

FIG. 6 is a block diagram showing the function of the present invention. An engine speed detecting means 90 detects the engine speed Ne, a desired engine speed calculating means 92 calculates the desired engine speed Ne' from the throttle position $\theta$, a second reference engine speed calculating means 94 calculates the second reference engine speed Nr2 from the throttle position $\theta$, a first reference engine speed calculating means 96 calculates the first reference engine speed Nr1 from the vehicle speed V, a vehicle speed detecting means 98 detects the vehicle speed V ($\propto$ Nout) and an engine torque calculating means 100 calculates engine torque T. The engine torque T is to be calculated as functions of the throttle position $\theta$ and the engine speed. A control mode determining means 102 compares Ne with Ne' and Nr1 with Nr2, and when (a) $Nr1 \leq Ne < Ne'$ and (b) $Ne < Nr1$ and $Ne \geq Nr2$ the speed ratio e is fixed by a speed change control stopping means 104 and varied by a speed change controlling means 106 in the other cases. A control voltage calculating means 108 calculates the control voltage corresponding to the speed ratio e and sent from the speed change control stopping means 104 or the speed change controlling means 106 to drive the flow controlling valve 38 on the basis of this control voltage. A line pressure calculating means 110 calculates the necessary minimum line pressure from the vehicle speed V and the engine torque T. A control voltage calculating means 112 calculates the control voltage corresponding to the line pressure to drive the pressure regulating valve 32 on the basis of this control voltage.

It will be apparent to those skilled in the art that various modifications and variations may be made in elements of the present invention without departing from the scope or spirit of the invention.

What is claimed is:

1. A continuous variable transmission for a vehicle provided with an internal combustion engine, which engine has a throttle valve, said transmission comprising:

transmission means arranged between the engine and the vehicle for obtaining a continuously changeable transmission ratio;

means for controlling a desired speed ratio of the transmission means;

means for storing a map of engine speed versus positions of said throttle valve for providing the minimum fuel consumption;

meand for detecting an actual position of the throttle valve;

means for detecting an actual engine speed;

means for detecting an actual vehicle speed;

first calculating means for calculating, by use of said map, a desired engine speed value corresponding to the detected throttle position;

means for determining a first operating area of the engine speed Nr2 based upon throttle opening, which area is spaced from said desired engine speed and is capable of providing sufficeint power to attain a smooth acceleration at fixed transmission ratio, due to an absence of transmission loss;

means for determining a second operating area of an engine speed Nr1 based upon a vehicle speed where the engine speed is high in relation to vehicle speed, which second area is spaced from said desired engine speed and is capable of providing sufficient power to obtain a smooth acceleration at a fixed transmission ratio together with the absence of transmission loss;

means for providing a signal to the transmission varying means for maintaining a current fixed speed ratio when the engine is operating in said first or second area; and means for providing a signal to the transmission varying means for varying the speed ratio so that the actual engine speed corresponds to the desired engine speed when the engine is in an area other than said first and second areas.

* * * * *